Dec. 18, 1951     R. P. WOODRUFF     2,579,165
RETRACTABLE STEERING KNOB
Filed April 7, 1951
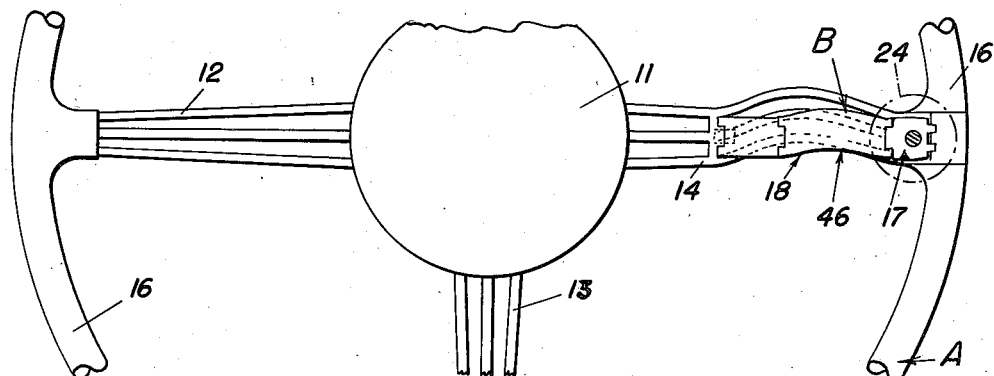
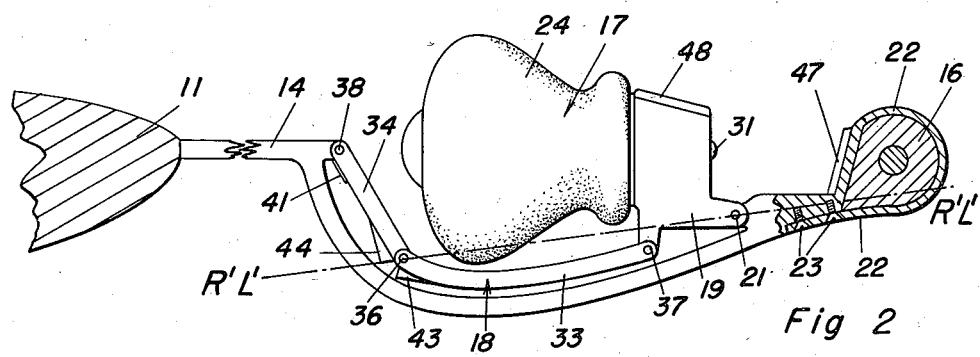
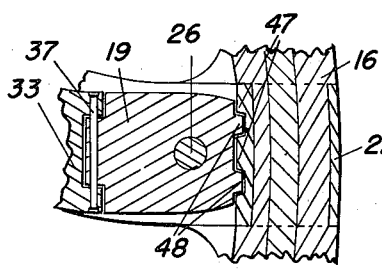
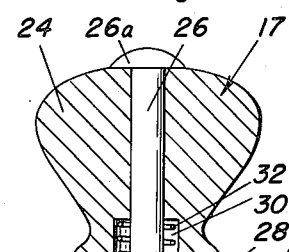
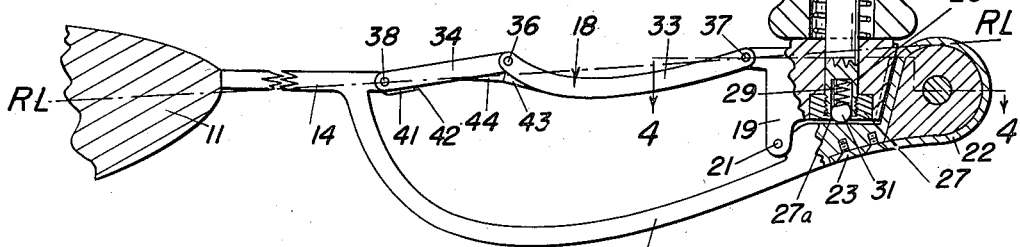
INVENTOR.
Roy P. Woodruff
BY
Townsend & Townsend
Attorneys Patented Dec. 18, 1951

2,579,165

UNITED STATES PATENT OFFICE 2,579,165

RETRACTABLE STEERING KNOB

Roy Paul Woodruff, Vallejo, Calif.

Application April 7, 1951, Serial No. 219,824

13 Claims. (Cl. 74—557)

This invention relates to a new and improved retractable steering knob for use in association with a vehicle steering wheel.

The particular embodiment of the invention which is illustrated in the drawings and which will be described hereinafter in greater detail comprises, generally (in combination with a steering wheel having a hub and an annular rim) a steering knob connected hingedly adjacent the rim of the wheel for movement from an upright position substantially perpendicular to the plane of the wheel toward the hub of the wheel and to a retracted position substantially parallel to the plane of said wheel. A supporting member connected rigidly to the hub is provided, and a foldable toggle link mechanism connecting the supporting member and steering knob is adapted to permit folding movement of the knob from retracted to upright position, and vice versa. A spring associated with the toggle is also preferably provided to urge the knob to upright position when the latter has been moved out of its fully retracted position. The toggle mechanism is arranged in such manner that the knob is normally locked in upright position against forces applied to the knob in the direction toward its retracted position. Moreover, the arrangement is such that the steering knob automatically locks in fully retracted position against forces exerted by the aforementioned spring.

A principal object of the present invention, therefore, is to provide a retractable steering wheel knob or the like possessing the characteristics hereinabove briefly mentioned, and which may be easily and rapidly moved from retracted to upright position, and vice versa.

Another object of the invention is to provide a retractable hinged steering knob unit wherein novel means are provided to relieve the hinge supporting the knob from torsional and shear forces imparted to said knob through steering manipulation of said knob.

Other objects of the present invention will become apparent upon reading the following specification and referring to the accompanying drawings in which similar characters of reference represent corresponding parts in each of the several views.

In the drawings:

Fig. 1 is a fragmentary top plan view of a steering wheel showing an embodiment of the present invention operatively mounted thereon.

Fig. 2 is a fragmentary view in side elevation of the invention showing the steering knob in retracted position.

Fig. 3 is the same as Fig. 2 but showing the steering knob in upright position.

Fig. 4 is an enlarged fragmentary view in section taken on line 4—4 of Fig. 3.

Referring now more particularly to the drawings, a more or less conventional steering wheel is indicated generally at A, on which has been operatively mounted an embodiment of the present invention, indicated generally at B.

Wheel A comprises more specifically a wheel hub 11 and radial spoke members 12, 13 and 14 which support annular rim or grip 16.

The embodiment of the invention heretofore designated generally at B comprises a steering knob assembly, indicated generally at 17, and a toggle link mechanism indicated generally at 18.

Steering knob mechanism 17 comprises a base member 19 hingedly secured as at 21 to supporting bracket 22. Bracket 22 comprises an annular band which is circumferentially clamped about rim 16 and secured thereto by screws, or equivalent means, such as indicated at 23. Preferably clamp 22 is imbedded or recessed within the rim material so as to present a substantially even and flush wheel-rim gripping surface.

Knob mechanism 17 comprises, in addition to base member 19 heretofore mentioned, a gripping knob 24, of more or less rounded configuration, supported rotatably on bolt or pin 26 which, in turn, is anchored to base member 19 by means of recessed cap-nut 27 having a central aperture 27a. The lower end of bolt 26 is formed with a well 28 adapted to receive and retain spring 29 and spherical ball-bearing 31 having a diameter slightly larger than the diameter of aperture 27a. The arrangement is such that a portion of ball-bearing 31 projects through aperture 27a, so as to bear on the upper surface of bracket 22 when the knob mechanism is erected to upright position. The spring bearing 31 provides, in effect, a spring cushion for the knob mechanism and substantially prevents objectionable rattle of base piece 19 against bracket 22 due to vehicular vibrations.

The bottom portion of knob 24 is provided with a spring well 30 encasing a suitable coil spring, such as indicated at 32. Said spring functions to spring bias knob 24 against head 26a of pin 26 and thereby substantially prevents the possibility of the knob chattering or rattling against the bolt or base member due to vibratory motion of the vehicle.

The toggle mechanism, heretofore designated generally at 18, comprises more specifically, toggle arms 33 and 34 pivotally joined together as at 36 forming a knee joint. The outer end of arm 33 is connected pivotally as at 37 to the upper portion of base member 19, and the outer end of arm 34 is similarly pivotally secured by pin 38 to wheel spoke 14, which, in turn, is rigidly joined to wheel-hub 11 and projects radially therefrom, as heretofore mentioned.

In the embodiment of the invention illustrated, the outer portion of spoke 14 is shown as being curved downwardly so as to accommodate the toggle link mechanism and steering knob when these latter elements are moved to retracted position.

The arrangement of the toggle mechanism is such that when steering knob 24 is raised to upright position ( as shown in Fig. 3), knee connection or joint 36 of the toggle moves upwardly to a point above plane R—L intersecting pivotal axes 37 and 38. A suitable coil spring 41, mounted on pin 38, and having a projecting end 42 engageable with the underside of arm 34, is adapted to normally urge arm 34 and knee joint 36 upwardly above plane R—L. A pair of stop or abutment members, indicated at 43 and 44, provided on the undersurfaces of arms 33 and 34, respectively, abut one another when the knee joint has been raised to its position illustrated in Fig. 3 and serve to limit the extent of permissible movement of the knee joint above plane R—L.

In view of the fact that movement of knob 24 to upright position causes knee joint 36 to move off center, i e., above plane R—L, said knob will automatically lock and be maintained in that position against forces applied to said knob in the direction of its retracted position. Thus, manual manipulation of the knob during steering operations will not displace it from upright position or cause it to move toward its retracted position.

The toggle and knob mechanism are also arranged and constructed in novel fashion so that, when the knob is moved to fully retracted position, the toggle link elements will coact to lock and maintain the knob in said position. It will be recalled that spring 41 exerts a continuous pressure against the underside of arm 34 normally tending to raise said arm and knee joint 36 above plane R—L, and consequently, to move the knob toward upright position. The relative arrangement between toggle connections 36, 37 and 38 and hinge pivot 21 is such that when the knob is moved to fully retracted position, pivot 37 moves below plane R'—L' intersecting knee joint 36 and hinge pin 21. It is thus seen that the force applied to the underside of arm 34 by spring 41 will actually tend to maintain the knob temporarily locked in fully retracted position. It is only when the knob has been moved out of fully retracted position far enough to cause hinge pivot 21 to move above plane R'—L' that the spring force of spring 41 will act to move arm 34 upwardly, as aforesaid.

In operation, knob 24 may be rapidly moved from retracted position to upright position by manually grasping and lifting upwardly on said knob. Such movement simultaneously and automatically will cause toggle elements to move to their respective positions shown in Fig. 3. The knob may be rapidly retracted merely by manually depressing arm 33, thus causing the toggle mechanism to fold at its knee joint and the knob to swing downwardly about its hinge axis 21.

It is to be noted that the link arms 33 and 34 of the toggle mechanism are shaped and proportioned so as to receive in substantially nested relationship the rounded knob 24 when said knob is moved to retracted position. This feature is of value in that when the steering knob is not in use, it may be retracted to a position well out of the way of normal steering activity.

It is also preferable that link arm 33 (which knob 24 directly overlies) be curved or formed with an arcuate notch, as indicated at 46, so that unimpeded manual access may be readily had to the underside of the knob when the latter is in retracted position. It has been found that it is extremely convenient for an operator in righting the knob to its erect position to engage the underside of the knob with only his thumb, for example, and rapidly flick it upwardly to upright position.

In order to relieve hinge 21 from torsional and shear forces which would otherwise be transmitted thereto in using the knob as a steering grip, a tongue and groove connection between the knob and its supporting bracket is preferably provided. More particularly Fig. 4 shows how the inner face of bracket 22 may be provided with a plurality of spaced lugs or teeth 47 which are mutually engageable with complementary lugs or teeth 48 provided on the outer face of base member 19.

The latter described tongue and groove connection between base member 19 and the bracket 22 transmits torsional and shear forces applied to the steering knob during steering operations directly to the steering wheel assembly, thereby taking the strain off of hinge 21.

Although the present invention has been described in some detail by way of illustration and example for purposes of clarity of understanding, it is understood that certain changes and modifications may be made within the spirit of the invention and scope of the appended claims.

I claim:

1. In combination with a steering wheel having an annular rim and a center hub; a steering knob, a hinge supporting said knob adjacent said rim for movement from an upright position substantially perpendicular to the plane of said wheel toward the hub of said wheel to a retracted position substantially parallel to the plane of said wheel, a supporting member rigidly connected to said hub, a toggle mechanism connecting said supporting member and said knob arranged and constructed for locking said knob in upright position against forces applied to said knob in a direction toward its retracted position.

2. A construction according to claim 1 and wherein there are provided mutually engageable elements associated with said knob and said wheel rim respectively for transmitting torsional and shear forces imparted to said knob during steering manipulation thereof directly to said rim, said mutually engageable means being disposed between said knob and said hinge.

3. In combination with a steering wheel having an annular rim and a center hub; a steering knob, a hinge supporting said knob adjacent said rim for movement from an upright position substantially perpendicular to the plane of said wheel toward the hub of said wheel to a retracted position substantially parallel to the plane of said wheel, a supporting member rigidly connected to said hub, a toggle comprising first and second arms, a first pivotal connection connecting together said first and second arms forming a knee joint, a second pivotal connection connecting said first arm adjacent its outer end to said knob, a third pivotal connection connecting said second arm adjacent its outer end to said supporting member, said knee joint of said toggle arranged to move from below to above a plane intersecting said second and third pivotal axes when said knob is moved from retracted to upright position for locking said knob in upright position against forces applied to said knob toward its retracted position.

4. A construction according to claim 2 and wherein a spring means associated with said toggle is provided to normally spring bias said knee joint upwardly.

5. A construction according to claim 2 and wherein said knob has a generally rounded configuration, and wherein said toggle arms are shaped and proportioned to receive in nested relationship portions of said knob when the latter occupies its retracted position.

6. A construction according to claim 2 and wherein spring means associated with said toggle is provided for normally urging said knee joint upwardly, and wherein the axis of said hinge is arranged and located relatively to the axis of said first, second and third pivotal connections for movement to a point below a plane intersecting said first and second pivotal axes when said knob occupies its fully retracted position, whereby said knob is locked in fully retracted position against forces applied to said toggle by said spring means.

7. A construction according to claim 3 and wherein there are provided mutually engageable elements associated with said knob and said wheel rim, respectively, for transmitting torsional and sheer forces imparted to said knob during steering manipulation thereof directly to said rim, said mutually engageable means being disposed between said knob and said hinge.

8. In combination with a steering wheel having an annular rim and a center hub; a steering knob, a hinge supporting said knob adjacent said rim for movement from an upright position substantially perpendicular to the plane of said wheel toward the hub of said wheel to a retracted position substantially parallel to the plane of said wheel, a supporting member rigidly connected to said hub, a toggle comprising first and second arms, a first pivotal connection connecting together said first and second arms forming a knee joint, a second pivotal connection connecting said first arm adjacent its outer end to said knob, a third pivotal connection connecting said second arm adjacent its outer end to said supporting member, said knee joint of said toggle arranged to move from below to above a plane intersecting said second and third pivotal axes when said knob is moved from retracted to upright position for locking said knob in upright position against forces applied to said knob toward its retracted position, spring means associated with said toggle normally urging said knee joint upwardly, the axis of said second pivotal axis arranged and located relatively to the axes of said hinge and said first and third pivotal connections for movement to a point below a plane intersecting said hinge and first pivotal axes when said knob occupies its fully retracted position, whereby said knob is locked in fully retracted position against forces applied to said toggle by said spring means.

9. A construction according to claim 8 and wherein said spring means comprises a spring mounted adjacent said third pivotal connection engageable with the underside of said second arm for normally exerting an upward force against the underside of said arm.

10. A construction according to claim 8 and wherein said knob is of generally rounded configuration, and wherein said first and second toggle arms are shaped and proportioned to receive in substantially nested relationship portions of said knob when the latter occupies its retracted position.

11. A construction according to claim 8 and wherein there are provided mutually engageable elements associated with said knob and said wheel rim, respectively, for transmitting torsional and shear forces imparted to said knob during steering manipulation thereof directly to said rim, said mutually engageable means being disposed between said knob and said hinge.

12. In combination with a steering wheel having an annular rim and a center hub; a steering knob, a hinge supporting said knob adjacent said rim for movement from an upright position substantially perpendicular to the plane of said wheel toward the hub of said wheel to a retracted position substantially parallel to the plane of said wheel, and mutually engageable elements associated with said knob and said wheel rim, respectively, for transmitting torsional and shear forces imparted to said knob during steering manipulation thereof directly to said rim, said mutually engageable means being disposed between said knob and said hinge.

13. In combination with a steering wheel having an annular rim and a center hub; a steering knob mechanism, a hinge supporting said knob mechanism adjacent said rim for movement from an upright position substantially perpendicular to the plane of said wheel toward the hub of said wheel to a retracted position substantially parallel to the plane of said wheel, said steering knob mechanism comprising a base member supporting rotatably a steering knob, a supporting bracket carrying said hinge and engaging said rim, and mutually engageable members provided on said base member and said bracket, respectively, for transmitting torsional and shear forces imparted to said knob during steering manipulation thereof to the rim of said wheel via said base member, said mutually engageable members and said bracket.

ROY PAUL WOODRUFF.

No references cited.